United States Patent Office 3,239,508
Patented Mar. 8, 1966

3,239,508
PREPARATION OF CYCLODODECANONE OXIME HYDROCHLORIDE AND ω-LAURIC LACTAM
Yoshikazu Ito, Mizuho-ku, Nagoya, and Yoichi Shimokawa, Minami-ku, Nagoya, Japan, assignors to Toyo Rayon Kabushiki Kaisha, Tokyo, Japan, a corporation of Japan
No Drawing. Filed Apr. 30, 1963, Ser. No. 277,044
Claims priority, application Japan, May 4, 1962, 37/17,562
7 Claims. (Cl. 260—239.3)

This invention relates to a process for preparing cyclododecanone oxime hydrochloride by subjecting cyclododecane to the action of a nitrosation agent in the presence of light as well as to a process for preparing ω-lauric lactam by effecting the Beckmann rearrangement of said cyclododecanone oxime hydrochloride in the presence of an acid or an acid chloride, for example, sulfuric acid. In particular, it relates to a process which is characterized in that the reaction is carried out in a state in which cyclododecane is mixed and dissolved with a cycloalkane having a ring structure of not more than 8 members.

More specifically, this invention relates to a process for preparing cyclododecanone oxime hydrochloride which comprises subjecting cyclododecane to the action of a chlorine-containing nitrosation agent under irradiating conditions to obtain an oil-like precipitate containing the corresponding two classes of oxime hydrochlorides, separating said oil-like precipitate and diluting the same with water thereby separating the cyclododecanone oxime hydrochloride; and to a process for preparing ω-lauric lactam which comprises separating the aforesaid oil-like precipitate, effecting the Beckmann rearrangement thereof in the presence of an acid or an acid chloride to obtain a mixture of ω-lauric lactam and the corresponding lactam of the aforesaid cycloalkane having a ring structure of not more than 8 members, and thereafter diluting said mixture with water to separate the ω-lauric lactam.

It is known hitherto to prepare cyclododecanone oxime hydrochloride by subjecting cyclododecane to the action of various nitrosation agents in a state in which the former is dissolved in an inert solvent not participating in the reaction, such as, for example, carbon tetrachloride, benzene, etc., under irradiating conditons.

However, in a process such as this, the cyclododecanone oxime hydrochloride formed either dissolves in considerable quantities in the reaction liquid or floats and hence it is difficult of being removed continuously and promptly to the outside of the reaction system. In addition, there is the fault that the cyclododecanone oxime hydrochloride either crystallizes and separates out or even though it is separated in its oil-like state, it immediately crystallizes to become adhered to the reactor wall so as not only to become difficult of being removed to the outside of the reaction system but also as it adheres to the light transmission portion of the reactor the transmission of light therethrough is prevented.

In order to solve such a fault of the conventional process and to find a commercially advantageous process for preparing cyclododecanone oxime hydrochloride and ω-lauric lactam, we engaged in much study with the consequence that we found that by subjecting cyclododecane to action of a nitrosation agent in the presence of a cycloalkane having a ring structure of not more than 8 members, which differing from the inert reaction solvent such as was hitherto used would not only itself participate in the reaction as a reactant but also serve as the reaction solvent at the same time, i.e., by subjecting the cyclododecane mixed and dissolved in said cycloalkane to the action of a nitrosation agent under irradiating conditions, thereby obtaining a mixture of cyclododecanone oxime hydrochloride and cycloalkanone oxime hydrochloride as an oil-like precipitate, separating said precipitate and thereafter adding water as a diluent, cyclododecanone oxime would separate out whereby cyclododecanone oxime hydrochloride could be very readily separated as compared with the aforementioned conventional process, and that by so doing the technical difficulties of the conventional process such as stated above, could be satisfactorily overcome.

On further investigation, we found that by carrying out the Beckmann rearrangement of the aforementioned oil-like precipitate directly in the presence of an acid or an acid chloride, for example sulfuric acid, a mixture of ω-lauric lactam and the corresponding lactam of the foregoing cycloalkane having a ring structure of not more than 8 members is obtained, and when this mixture was diluted with a suitable quantity of water, ω-lauric lactam would separated out as white crystals.

According to this invention which is based on such a discovery, cyclododecanone oxime hydrochloride and ω-lauric lactam can be prepared with advantage commercially.

It is therefore an object of the present invention to provide a process for preparing cyclododecanone oxime hydrochloride commercially with advantage and very effectively, the process being that wherein, in contrast to the hitherto-known reaction in which was used an inert reaction solvent, the reaction is carried out in the presence of a cycloalkane having a ring structure of not more than 8 members which not only itself participates in the reaction as a reactant but also serves as the reaction solvent at the same time, whereby not only the removal of the reaction product to the outside of the system is very readily as well as continuously accomplished but also the troublesome separation out and adherence of the reaction product on the light transmission portion of the reactor to hinder the transmission of light therethrough is prevented.

Another object of this invention is to provide a process for preparing cyclododecanone oxime hydrochloride in which not only side reactions are controlled but also continuous operation is made possible.

A further object of the invention is to provide a very advantageous and effective process for preparing ω-lauric lactam which comprises obtaining the oil-like precipitate of a mixture of oxime hydrochlorides, effecting the Beckmann rearrangement of this mixed oil-like precipitate in its as-obtained state to obtain a mixture of ω-lauric lactam and the corresponding lactam of the cycloalkane having a ring structure of not more than 8 members, and readily separating the ω-lauric lactam from said mixture thereby preparing the same with advantage and effectiveness commercially without moreover the need for isolating the cyclododecanone oxime hydrochloride separately.

Other objects and advantages of this invention will become apparent from the following description thereof.

According to this invention, since the cycloalkane having a ring structure of not more than 8 members, which is to be mixed, functions as a solvent as well as participates in the reaction, a mixture of cyclododecanone oxime hydrochloride and the corresponding oxime hydrochloride of the cycloalkane having a ring structure of not more than 8 members is obtained as the product of the nitrosation reaction. This mixture which is obtained as an oil-like precipitate dos not substantially dissolve in the reaction liquid. Hence, it is very readily isolated. When this mixture is diluted wth a suitable amount of water, cyclododecanone oxime hydrochloride is seperated out as insoluble crystals. By filtering this, the two oxime hydrochlorides can very readily be separated substantially quantitatively. The oxime hydrochlorides of cycloalkanes having a ring structure of not more than 8 members being water-soluble can readily be separated and filtered off by neutralizing them to a pH of the order of 6.0 by means of an aqueous alkaline solution such as, for example, an aqueous sodium hydroxide solution, an aqueous calcium hydroxide solution, etc. On the other hand, if the Beckmann rearrangement is carried out in the presence of an acid or an acid chloride without separating the two oxime hydrochlorides of the mixture, a mixture of corresponding lactams of the two classes of oximes is readily obtained. When this lactam mixture is poured into water, $\omega$-lauric lactam is readily separated out. As the acid or acid chloride, included are such as sulfuric acid or fuming sulfuric acid, chlorosulfonic acid, phosphorus pentachloride, etc. A reaction temperature ranging from 90° to 150° C. is suitably used, a temperature of from 110° to 120° C. being particularly preferred.

According to this invention, since it is not only possible to remove continuously and promptly the mixture of the cyclododecanone oxime hydrochloride and the oxime hydrochloride of a cycloalkane having a ring structure of not more than 8 members, to the outside of the reaction system as an oillike precipitate but also to separate readily from said oillike precipitate the two oxime hydrochlorides in their pure form, the technical difficulties encountered in the conventional processes are all overcome and cyclododecanone oxime hydrochloride can be obtained commercially with great advantage and effectiveness.

In addition, it becomes possible to produce commercially with advantage both the cyclododecanone oxime hydrochloride and an oxime hydrochloride of a cycloalkane having a ring structure of not more than 8 members, at the same time. As the molar ratio of the two oxime hydrochlorides in this case is practically equivalent to the weight ratio of the cyclododecane and the cycloalkane mixed therewith in the reaction liquid, the desired quantities of the two oxime hydrochlorides can be obtained by suitably varying the proportion of the cyclododecane and the cycloalkane caused to be copresent. This likewise applies in the case of the preparation of $\omega$-lauric lactam. Namely, it is possible to obtain in the desired proportion the $\omega$-lauric lactam and the other lactam.

For controlling the occurrence of side reactions as much as possible and for carrying out the reaction continuously over an extended period of time, it goes without saying that the removal of the product continuously and promptly to the outside of the reaction system serves its purpose.

According to the process of this invention, the cycloalkane having a ring structure of not more than 8 members which is to be copresent with the cyclododecane and which not only itself becomes a reactant but also serves at the same time as the reaction solvent includes the cycloalkanes containing 5 to 8 carbon atoms such as, for example, cyclopentane, cyclohexane, cycloheptane and cyclooctane.

On the other hand, as the chlorine-containing nitrosation agent, included are nitrosyl chloride and the mixed gases of nitrosyl chloride and hydrogen chloride, of chlorine and nitrogen monoxide, of nitrogen monoxide, chlorine and hydrogen chloride, of the gas obtained by the catalytic oxidation of $NH_3$, which is a mixture of nitrogen oxides consisting mainly of NO and $NO_2$ gases, and hydrogen chloride, of nitrogen monoxide, nitrogen peroxide and hydrogen chloride, etc. In this case, the reaction can be carried out more favorably by the incorporation of hydrogen chloride in excess.

In the case the reaction is to be carried out continuously over an especially extended period of time, there is a tendency that the light transmission rate falls off due to formation of a yellow or brown viscous coating on the light transmitting portion of the reactor in contact with the reaction liquid. This tendency, however, can be controlled to an extent such that substantially no hindrance at all will be caused to the reaction by the elimination of ultraviolet rays of wave lengths shorter than 350 m$\mu$ by means of the method of employing an ultraviolet filter glass and a water-soluble fluorescent agent, as proposed previously by us.

For a clearer understanding of the invention, the following examples are given. However, the invention is not intended to be limited to these examples.

Example 1

A cylindrical glass reactor, 8.0 cm. inside diameter and 25 cm. high and equipped with a valved outlet at its bottom, was charged with a dissolved mixture of 400 grams of cyclododecane and 400 grams of cyclohexane. Into this was then immersed a light source consisting of a 270-W rod-shaped high pressure mercury lamp inserted into a glass tube equpped with a jacket for cooling water and whose one end was open. With the mercury lamp turned on, a mixed gas of nitrosyl chloride and hydrogen chloride was blown in at the rates respectively of 140 cc. per minute and 480 cc. per minute to the bottom of the reaction liquid maintained at a temperature of 12° C. The reaction liquid changed from colorless to light yellow, and about 10 to 15 minutes later a light yellow oillike substance was separated out at the valved outlet at the bottom of the reactor. In this manner, 65.0 grams of an oillike product was obtained with a reaction time of 2 hours. This was diluted with about 200 cc. of water and the white crystals separating out were filtered off. In this manner, 27.6 grams of cyclododecanone oxime, M.P. 133–134° C., was obtained. On the other hand, by neutralizing the filtrate with 20% caustic soda to a pH of 6.0, 15.0 grams of cyclohexanone oxime, M.P. 88–89° C., was obtained. The molar ratio of the two oximes obtained was equal to about 1.

Example 2

When the reaction was carried out following the same procedures as in Example 1 except that a similar apparatus was charged with a dissolved mixture of 275 grams of cyclododecane and 550 grams of cyclohexane, 120.0 grams of an oillike substance was obtained with a reaction time of 4 hours. When this was similarly treated, 34.0 grams of cyclododecanone oxime and 40.8 grams of cyclohexanone oxime were obtained. The molar ratio of the two oximes obtained was equal to about 1/2.

Example 3

Employing the same apparatus as in Example 1, a dissolved mixture of 200 grams of cyclododecane and 600 grams of cyclohexane was charged thereto. As the cooling water for the light source, water to which has been added a fluorescent agent "Whitex" RP (a trade name, produced by Sumitomo Chemical K.K.) at the rate of 0.5 gram per liter of water was used, which was passed through the cooling jacket for the light source at the rate of 300 cc. per minute after cooling to 10° C. The light of wave lengths shorter than 400 m$\mu$ irradiated from the light source under these conditions was completely absorbed by the cooling jacket to give visible light as fluorescence. When the reaction was otherwise carried out following exactly the same procedures as in Example 1, 126.5 grams of an oillike product was obtained with a reaction time of 4 hours. From this were obtained 28.5 grams of cyclododecanone oxime and 49.3 grams of cyclohexanone oxime. Even after completion of the reaction, hardly any formation of a colored coating could be observed on the surface of the glass cooling jacket in contact with the reaction liquid.

In contrast, when 10° C. water only was used as the cooling water of the mercury lamp, the yield of the oillike product was 110.5 grams, from which were obtained 24.8 grams of cyclododecanone oxime and 43.0 grams of cyclohexanone oxime. Moreover the formation of a brown coating was observed on the surface of the cooling jacket on the whole of its light transmitting portion after the reaction.

Example 4

When to the same apparatus as in Example 1 was charged a dissolved mixture of 200 grams of cyclododecane and 600 grams of cyclooctane, and the reaction was carried out following the same procedures, 145.5 grams of an oillike product was obtained with a reaction time of 4 hours. By treating this as in Example 1, 28.0 grams of cyclododecanone oxime and 63.0 grams of cyclooctanone oxime were obtained.

Example 5

120.0 grams of the oillike product obtained by employment of the apparatus of Example 2 and following the same procedures as in said example was with good stirring gradually introduced into 30 grams of 100% sulfuric acid heated at 115–120° C. while concurrent therewith 75 grams of 100% sulfuric acid was poured therein. While the rate of introduction was adjusted so as to maintain the above temperature, cooling or heating may be suitably performed, as required. When the resulting product was poured onto 300 grams of ice, ω-lauric lactam was separated as white crystals. This was filtered by means of suction followed by washing with water. In this manner was obtained 33.0 grams of ω-lauric lactam, M.P. 150–151° C.

On the other hand, when the filtrate was neutralized to pH 6.0 with concentrated ammonia water, since an ε-caprolactam-containing product was separated to the upper layer, this was separated. Then, by extracting the lower layer with, say, chlorofom an additional amount of ε-caprolactam was obtained. This was added to the former and then by vacuum distillation 39.0 grams of ε-caprolactam, M.P. 67–68° C., was obtained.

What is claimed is:

1. A process for preparing cyclododecanone oxime hydrochloride which comprises subjecting cyclododecane under irradiating conditions to the action of a chlorine-containing nitrosation agent in the presence of a cycloalkane having a ring structure of not more than 8 members to obtain an oillike precipitate containing the corresponding two classes of oxime hydrochlorides, separating said oillike precipitate, and then diluting the same with water to separate out cyclododecanone oxime hydrochloride.

2. The process according to claim 1 in which said cycloalkane having a ring structure of not more than 8 members is at least one compound selected from the group consisting of cyclopentane, cyclohexane, cycloheptane and cyclooctane.

3. The process according to claim 1 in which said chlorine-containing nitrosation agent is at least one compound selected from the group consisting of nitrosyl chloride and the mixed gases of nitrosyl chloride and hydrogen chloride, of chlorine and nitrogen monoxide, and of nitrogen oxides and hydrogen chloride.

4. An improved process for preparing ω-lauric lactam which comprises subjecting cyclododecane under irradiating conditions to the action of a chlorine-containing nitrosation agent in the presence of a cycloalkane having a ring structure of not more than 8 members to obtain an oillike precipitate containing the corresponding two classes of oxime hydrochlorides, separating said oillike precipitate, effecting the Beckmann rearrangement of said precipitate in the presence of at least one compound selected from the group consisting of the acids and acid chlorides to obtain a mixture consisting of ω-lauric lactam and the corresponding lactam of said cycloalkane having a ring structure of not exceeding 8 members, and thereafter diluting said mixture with water to separate the ω-lauric lactam.

5. The process according to claim 4 in which said cycloalkane having a ring structure of not more than 8 members is at least one compound selected from the group consisting of cyclopentane, cyclohexane, cycloheptane and cyclooctane.

6. The process according to claim 4 in which said chlorine-containing nitrosation agent is at least one compound selected from the group consisting of nitrosyl chloride and the mixed gases of nitrosyl chloride and hydrogen chloride, of chlorine and nitrogen monoxide, and of nitrogen oxides and hydrogen chloride.

7. The process of claim 4 in which said acid and acid chloride is at least one compound selected from the group consisting of sulfuric acid, fuming sulfuric acid, chlorosulfonic acid and phosphorus pentachloride.

References Cited by the Examiner

UNITED STATES PATENTS

| | | | |
|---|---|---|---|
| 3,022,291 | 2/1962 | Muench et al. | 260—239.3 |
| 3,060,173 | 10/1962 | Von Schick et al. | 260—239.3 |
| 3,090,739 | 5/1963 | Ito | 260—239.3 |
| 3,111,515 | 11/1963 | Muench et al. | 260—239.3 |

WALTER A. MODANCE, *Primary Examiner.*

JOHN D. RANDOLPH, ROBERT T. BOND,
*Assistant Examiners.*